United States Patent
Gooty et al.

(10) Patent No.: US 7,607,124 B2
(45) Date of Patent: Oct. 20, 2009

(54) METHOD FOR DEBUGGING A BUSINESS PROCESS FLOW

(75) Inventors: Subramanyam A. Gooty, Fremont, CA (US); Rangarajan S. Manavalan, Sunnyvale, CA (US); Xiaochun Mei, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 11/837,534

(22) Filed: Aug. 12, 2007

(65) Prior Publication Data

US 2007/0276692 A1 Nov. 29, 2007

Related U.S. Application Data

(63) Continuation of application No. 10/740,931, filed on Dec. 19, 2003.

(51) Int. Cl.
*G06F 9/44* (2006.01)
(52) U.S. Cl. .................. 717/129; 717/128; 717/124; 717/125
(58) Field of Classification Search .................. 717/102, 717/177, 124–135; 705/26
See application file for complete search history.

(56) References Cited

U.S. PATENT DOCUMENTS

| 6,058,393 A | 5/2000 | Meier |
| 6,256,773 B1 | 7/2001 | Bowman-Amuah |
| 6,324,647 B1 | 11/2001 | Bowman-Amuah |
| 6,324,683 B1 | 11/2001 | Fuh |
| 6,473,794 B1 | 10/2002 | Guheen |
| 6,519,571 B1 | 2/2003 | Guheen |
| 6,536,037 B1 | 3/2003 | Guheen et al. |
| 6,615,166 B1 | 9/2003 | Guheen |
| 6,629,081 B1 | 9/2003 | Cornelius |
| 7,155,715 B1 * | 12/2006 | Cui et al. ............... 717/177 |
| 2002/0087949 A1 | 7/2002 | Golender |
| 2003/0200527 A1 * | 10/2003 | Lynn et al. ............ 717/102 |
| 2004/0031019 A1 * | 2/2004 | Lamanna et al. ...... 717/125 |
| 2005/0071243 A1 * | 3/2005 | Somasekaran et al. ...... 705/26 |

* cited by examiner

*Primary Examiner*—Lewis A Bullock, Jr.
*Assistant Examiner*—Michael Yaary
(74) *Attorney, Agent, or Firm*—Michael J. Buchenhorner; Prentiss W. Johnson

(57) ABSTRACT

A method for debugging a process in a workflow engine, wherein the process includes a plurality of activity points, includes steps of: attaching to a running business process being controlled by the workflow engine; initiating a debugging session; receiving a set of breakpoints to be inserted into designated points in the process; stopping the running of the process at one or more of the breakpoints; and presenting a user with information relating to where the process has stopped and the status of the process flow.

9 Claims, 4 Drawing Sheets

```
ContinuationContext _currCC;
while (true)
{
    _currCC = _dequeueCC();

// Jump to the next state for execution.
    switch(_currCC.nextNode)
    {
        case 0:
        ...
        // Action Node 1
        case node1_id:      {
        //action node 1 logic
        }
        break;

case node2_id:      {
        //action node 2 logic
        }
        break;
        ...
    }
}
```

METHOD FOR DEBUGGING A BUSINESS PROCESS FLOW

CROSS-REFERENCE TO RELATED APPLICATIONS

This application is a continuation of U.S. application Ser. No. 10/740,931, filed on Dec. 19, 2003; said application incorporated by reference in its entirety as if fully set forth herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

Not Applicable.

FIELD OF THE INVENTION

The invention disclosed broadly relates to the field of information technologies and more particularly relates to the field of debugging workflow programs.

BACKGROUND OF THE INVENTION

Workflow engines perform an automatic routing of documents to the users responsible for working on them. The documents may be physically moved over the network or maintained in a single database with the appropriate users given access to the data at the required times.

A typical workflow engine has two components, design and runtime. The design component typically is a GUI (graphical user interface) tool. It allows user to define a business work flow process in a diagram using UI elements such as action nodes, decision nodes and sub-diagrams. The action node could define the execution logic, decision node can be used to implement routing decisions based on some criterial data and a sub-diagram to incorporate other business process modules.

The runtime component of workflow engine is responsible for processing business data according to one or many workflow processes predefined by end user using above design components. When business data is processed, the runtime component needs to take the data through the flow path designed and defined in the business flow process. In order to do this, any workflow engine needs to track, monitor and/or persist the state change of the data. The definition of state change here is that, when data enters a new node, leaves the node and moves to next node, the state of data changes.

A traditional way to debug a workflow process running in a workflow engine is to use an IDE (integrated development environment), such as MS Visual C++(for C++), Eclipse (for Java), etc. A user has to run the engine within an IDE in a special debugging mode. To debug, user needs to set one or many a breakpoints in the line of source code. When the running application reaches the breakpoint(s), it pauses for user instruction to continue.

There are numerous drawbacks of this traditional debugging mechanism to debug a workflow. One drawback is that debugging is at the source code level, not at a business process level. A user has to debug a workflow process at source code level. A workflow process source code is typically mixed with the underlying workflow engine source code. While the user defines a workflow in a process designing tool, the user may only understand the GUI representation of the flow, but not the underlining source code. Debugging in source code is a big challenge to the user.

Another drawback is that the production application is down while debugging. The runtime component, typically the workflow engine, needs to be started in a special debugging mode and this means the component will not be running in a production mode. This could mean loss of productivity.

Yet another drawback is that an IDE tool is required to debug the process flow. Therefore, there is a need for a debugger that overcomes the aforesaid drawbacks.

SUMMARY OF THE INVENTION

According to the invention we implement a mechanism in a workflow engine that allows an event to be debugged in the engine at a process level, while the engine is functioning normally. The workflow engine implements this functionality by exposing a set of debugging APIs.

DETAILED DESCRIPTION

Figure 1:
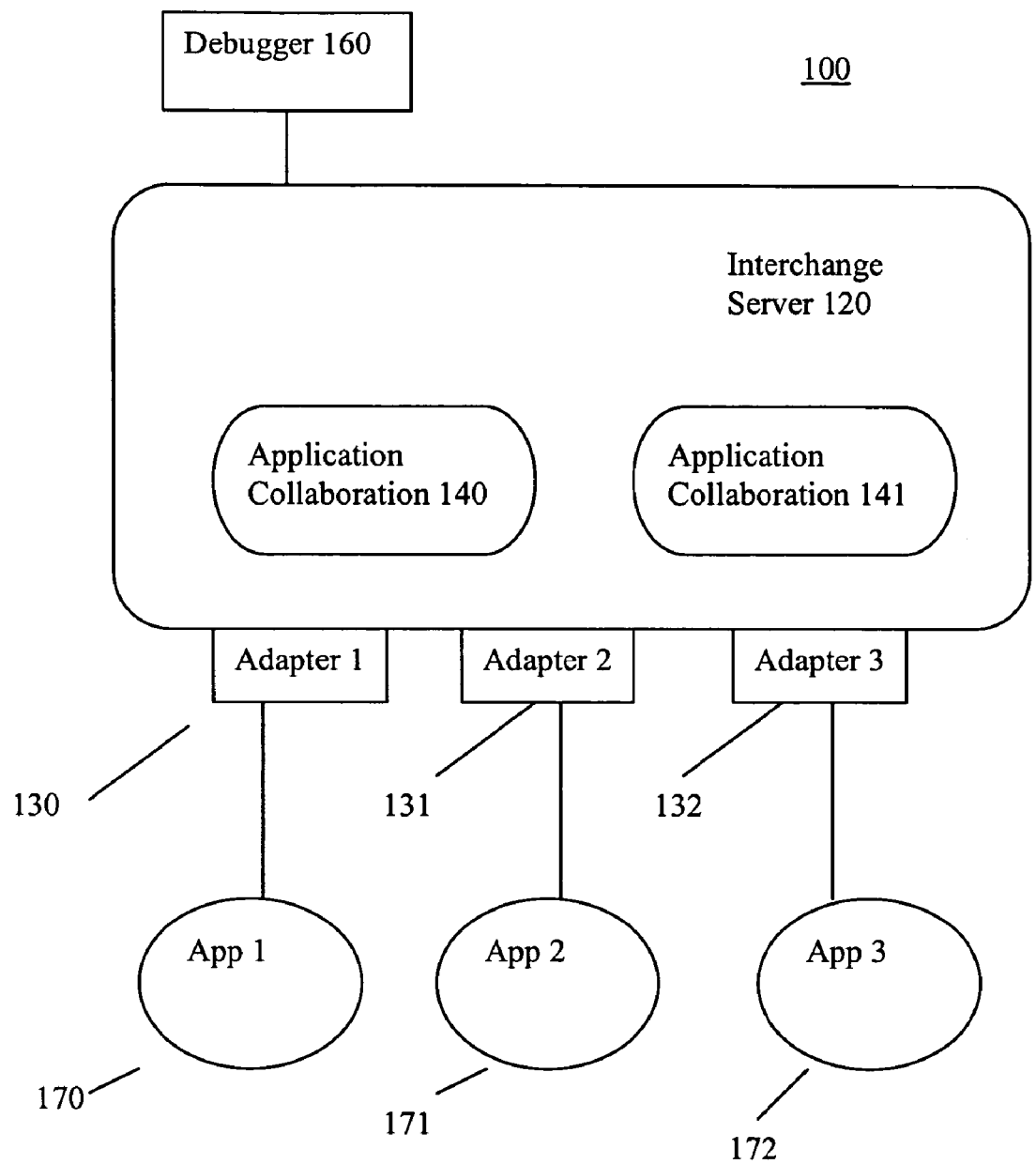
FIG. 1 is a schematic block diagram of a modular application integration system according to one embodiment of the present invention.

Referring to FIG. 1, there is shown a block diagram of a hub and spoke application integration system 100 that includes an interchange server 120 having one or more adapters (also known as connectors) 130, and one or more application collaboration modules 140, and a collaboration debugger 160 according to an embodiment of the invention. Coupled to each connector 130 is an application 170. A system such as the system 100 (without the debugger) is described in U.S. Pat. No. 6,233,585 the specification of which is hereby incorporated by reference.

The Interchange server 120 is a distributed application server that includes a workflow engine function and that provides an object oriented run-time platform for all components. It also provides mechanisms to manage, configure and control components and provides all of the reliability, availability, and serviceability features (the RAS features) found in a typical server environment. An object component can reside in any interchange server within the same administrative domain. An administrative domain is a suite of interconnected connectors, application collaboration modules and interchange servers. Multiple cooperating interchange servers can run on different platforms. Platform in this case means any base software environment, including operating systems, databases (if necessary), and/or middleware.

Connectors 130-132 enable applications to communicate with interchange server 120. Connectors 130 handle all the details of interfacing with applications 170-172, and provide an object oriented interface to represent the application in the interchange server's object and data model. Connectors 130 communicate with applications 170-172 and provide a schema for interacting with other applications in the interchange server's object-oriented model. Connectors can be thought of as having two ends. An "interchange-end" is an object-oriented proxy schema for the application's data and methods. An "application-end" is a driver for the application's APIs. In other words, the connector's interchange-end presents a "virtual" object interface to the interchange server for the data and methods (behavior) that reside in the application. To allow application collaboration modules to be re-used across connectors, the virtual object interface presented by the interchange-end of the connector is similar for connectors having the same application class but which are produced by different vendors. The application-end of a connector is concerned with transferring information from application to the virtual objects and with propagating changes (requests for change) made to the virtual objects back to application. The application-end of connector 130 also contains vendor specific logic required to manipulate the vendors APIs. Connectors are application and vendor-specific.

Application collaboration modules 140-141 provide the specific integration business logic and process flows required to integrate two or more applications 170-172. Application collaboration modules 140 contain the re-usable part of the integration business logic. An application collaboration module requires an interchange server 120 and an appropriate connector for each application 170-172 participating in a collaboration. Application collaboration modules 140-142 are specialized objects that coordinate communication and process flows between connector objects. Any application collaboration module executing in the interchange server 120 will see only the interchange-end of any connector. Application collaboration objects implement the business interactions in terms of message exchanges between the interchange server's services (which are objects), the participating application's connector objects and other application collaboration objects. A collaboration debugger 160 is coupled to the interchange server 120 for debugging the collaborations 140-142.

The collaboration in the interchange server 120 is a set of software modules that describe business processes (Collaboration Template) and can be run within the interchange server 120 (Collaboration Object). An interchange server user can create a new or modify an existing business process in the interchange server 120 and bind and run the business process to external system through the adapters 130-132.

To help a user debug the business process created in interchange server 120, a collaboration debugger 160 is introduced. The collaboration debugger 160 allows a user to run the business process in debug mode. To debug the collaboration the user sets breakpoints in the business process. When the process of incoming events reaches a breakpoint, the debugger shows the user where the process stops, what is the status of the flow, and let user to choose how to continue the process.

The workflow engine exposes the following set of APIs that a remote client can use to debug a process flow executing in the workflow engine.

1) Debug session management APIs. End user can use them to start, stop a debug session, or to query whether a collaboration is in a debugging session.

2) Breakpoint management APIs. A debugger can use these APIs to set or unset breakpoint(s). A break point can be added when an event changes state—from one process node to another node.

3) Process management APIs. When an instance of a running business process is paused at a breakpoint, a debugger can use these APIs to resume the paused process and instruct it to how to proceed. For example, a debugger can instruct a paused process to step over the current node and pause at the next activity node.

4) Variable inspection APIs. When an instance process pauses at a breakpoint, a debugger can use these APIs to get values of some of collaboration variables to display to customer.

5) Callback APIs. This kind of API is the running workflow engine to notify a debugger what is happening for a debugged flow.

The main objective of the Collaboration Debugger 160 is to help the user to debug the business process logic designed in interchange server collaboration. The user can use collaboration debugger 160 to attach to a running collaboration, set/unset breakpoints in a business process, send a triggering event to interchange server, and watch how the running collaboration processes the flow.

When an instance of running collaboration processes a flow of activities, it will pause at the breakpoints set up by attached collaboration debugger. When this happens, the user can query the value of some variables of the instance of the running collaboration, and/or instruct the business process of how to proceed.

An activity diagram in the interchange server 120 comprises one or more action nodes, a decision node, an iterator node, and a sub-diagram. An action node can be a manipulation of some Business Objects (BOs), or an interaction with external system through service call. A decision node is a node that a choice will be made based on some data criteria, or exception handling. A Sub-diagram is a node used to represent another activity diagram. An iterator node is a special sub-diagram that the business process will iterate underlying sub-diagram based on a user-designed setup.

Figures 2A, 2B:
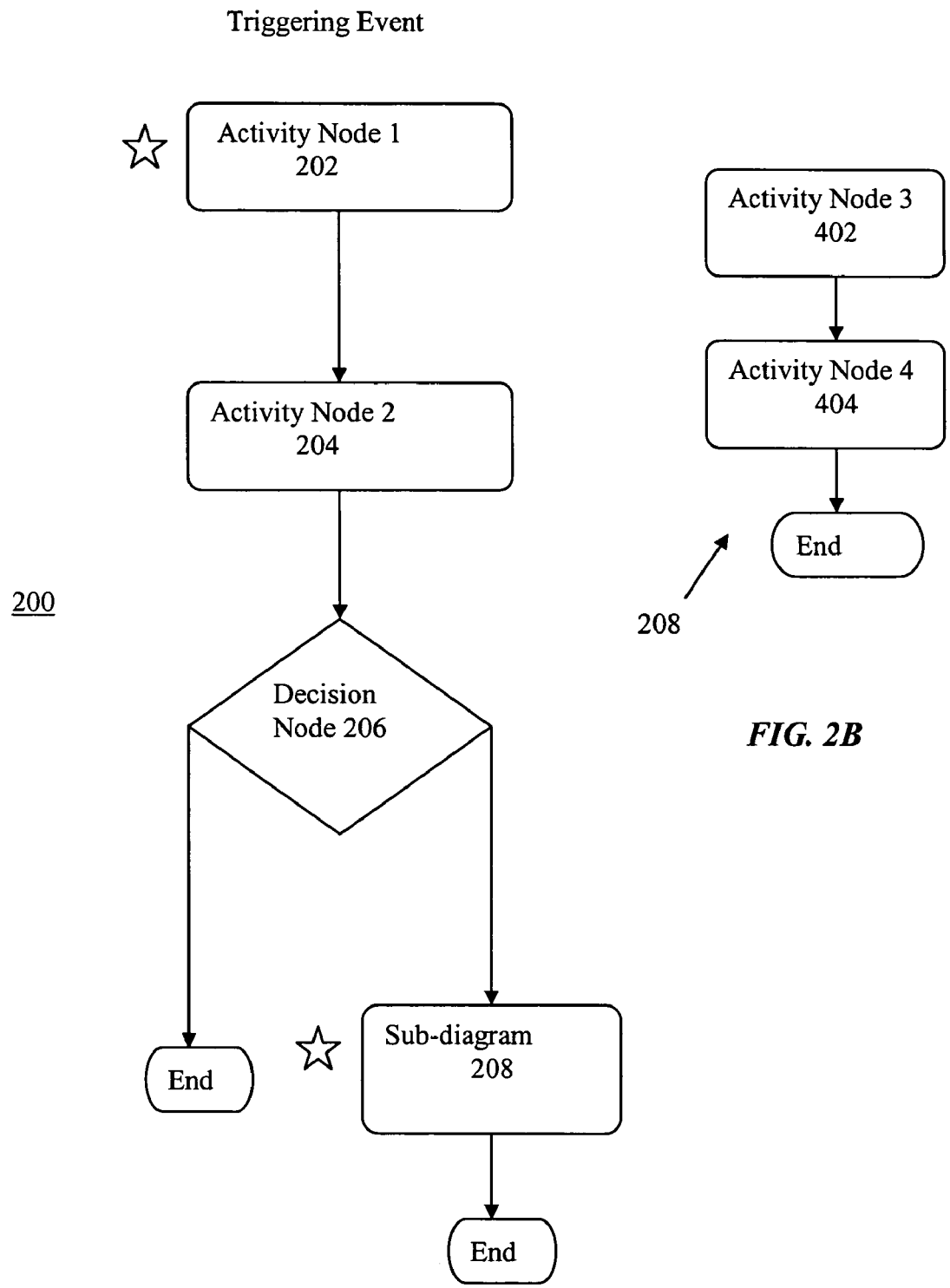
FIGS. 2A-C show a activity diagram according to an embodiment of the invention.

Referring to FIGS. 2A and 2B, there is shown an activity diagram 200 of the collaboration logic according to an embodiment of the invention. The activity diagram's representation and execution are done through a two-part entity, which comprises a repository definition and a runtime object. The activity diagram 200 comprises a plurality of blocks (e.g., blocks 202 and 204) representing an activity in the business process of the collaboration. Decision diamond 206 represents a decision in the business flow, such as approval of a contract wherein the process diverges to different levels of management depending on the monetary amount of the contract. In the example shown, the process either ends or else it proceeds to a sub-diagram 208 representing an activity flow, the completion of which ends the process. The activity nodes 402 and 404 comprised by the sub-diagram 208 are shown in FIG. 2B.

According to an embodiment of the invention, the process represented by the activity diagram 200 is presented or displayed to the user by a graphical user interface (GUI). A collaboration template is the repository definition part. It contains all of the collaboration's execution logic, but is not executable. The port(s) the execution logic uses to communicate with outside world is (are) a virtual port(s), which is not attached to any physical adapters and therefore cannot be executed at runtime.

To execute the business logic of a template, the user has to first create a collaboration object from the template, then configure the collaboration object by binding it to connectors or other collaboration objects. A configured collaboration object becomes a runnable object and can be executed to process triggering events based on the business logic.

Although a business process is defined in a template, in order to debug it, a user has to create, configure and deploy a collaboration object.

Communication Protocol.

Figure 3:
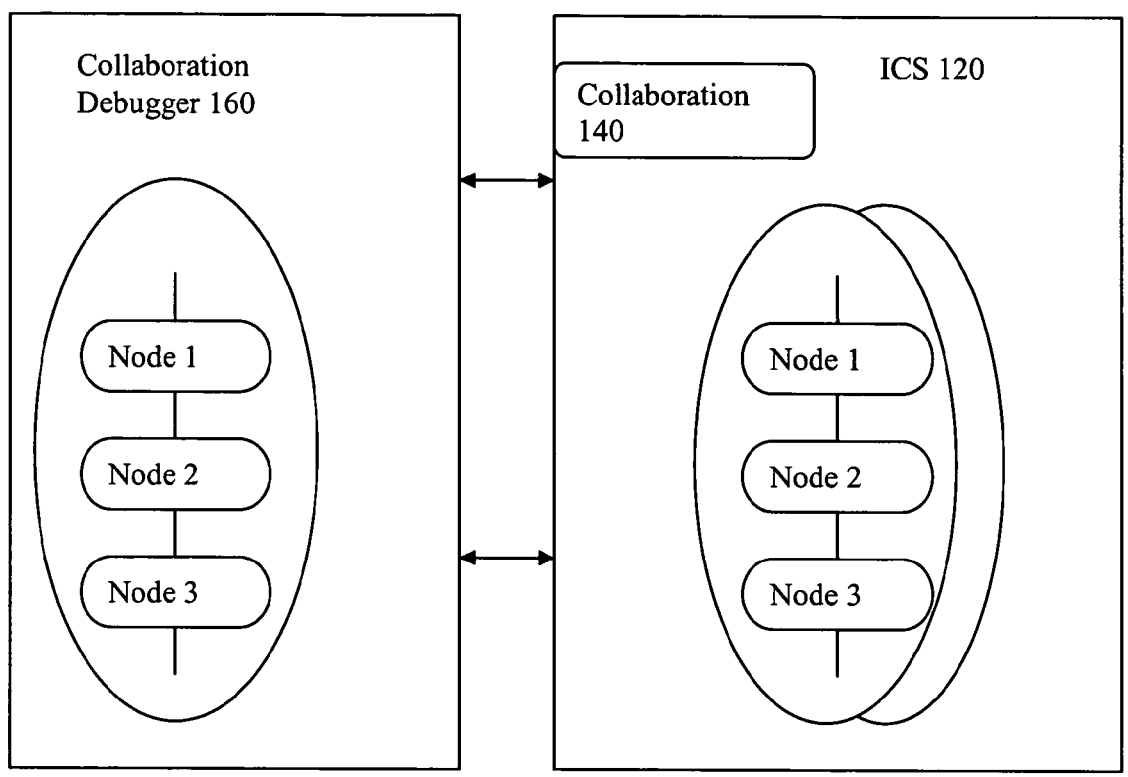
FIG. 3 is a high level block diagram showing communication between the collaboration debugger and the interchange server.

Referring now to FIG. 3, there is shown a simplified block diagram illustrating the communication between the interchange server 120 and the collaboration debugger 160. In the preferred embodiment, the communication between these entities is accomplished through CORBA (common object request broker architecture) and over IIOP (internet inter-ORB protocol). The communication is two-way, as depicted in FIG. 3. The collaboration debugger 160 uses an IIOP call to control the collaboration 140 being debugged. The collaboration 140 uses an IIOP callback to notify the collaboration debugger 160 of the status of a flow—such as whether a breakpoint is reached, or which action node it is currently running.

A Debugging Session.

Figure 2C:
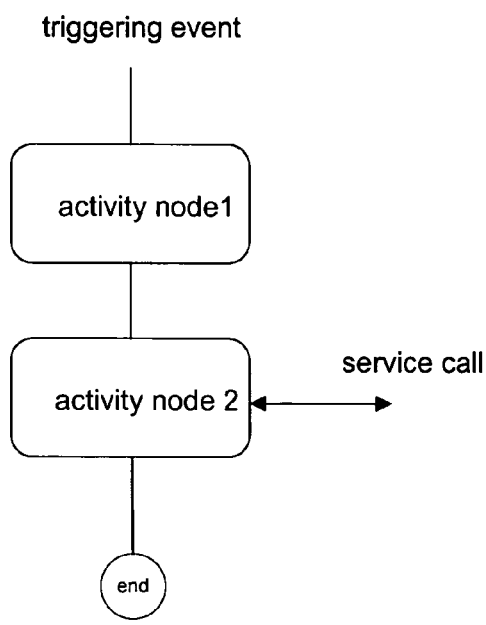

Before a user can start debugging a collaboration 140, s/he needs to login to the server 120 on which the collaboration 140 is running. A debugging session is a period of time that a running collaboration is in a debugging mode. A debugging session will start after a running collaboration is attached by the collaboration debugger 160. Only after a debugging session starts, the user can set breakpoint in the collaboration, and the collaboration flow can stop at the breakpoint. Referring again to FIG. 2, the user-set breakpoints are indicated by a star. A collaboration debugger can attach to multiple collaborations. However, no more than one debugger can attach to the same collaboration.

A debugging session ends when the attached collaboration debugger detaches from it. When it ends, all the breakpoints set during the debugging session will be removed; if a flow stops in a breakpoint when the session ends, the flow will be resumed and continue toward to the end.

A break point is a node in an activity diagram that when reached by a running business process, the process will pause if it is in a debugging mode. A collaboration debugger user can set any number of breakpoint in a business process, this is similar as a programmer can set multiple breakpoints in a program.

When an instance of a business process pauses at a break point, the user can retrieve data from the process to inspect what is happening, and issue a command to instruct the flow how to proceed.

What to Display at a Breakpoint.

At any breakpoint, the user can inspect a triggering event or events and all global variables defined in the collaboration template of which the data type are either Business Object (BO) or Java primitive type. Other implementations of the invention could allow more variables to be displayed.

The Step-Over, Step-Into, Step-Out, Run-to, and Continue Commands.

The user can issue any of the following commands to a paused business process: step-over, step-into, step-out, run-to, and continue.

The Step-Over Command.

After the interchange server 120 receives a "step-over" command, it will resume the paused business process, continue to the next activity node and pause. In the example template of FIG. 2A, a "step-over" from breakpoint 1 (activity node 202) will make the flow run and pause at activity node 204. A "step over" from breakpoint 2 (beginning of a sub-diagram 206) will end with the end node (step over the sub-sub diagram 208).

The Step-Into Command.

"Step-into" only applies to a sub-diagram or iterator node. After the interchange server 120 receives a "step-into" command, it will resume the paused business process, continue to the first node (begin node) in the sub-diagram 208 (or iterator sub-diagram) and pause. In the example template, the "step-into" from breakpoint 2 (a sub-diagram node) will end with the begin node in the sub-diagram 208.

The Step-Out Command.

The "Step out" command only applies to the nodes inside a sub-diagram or iterator sub-diagram. After the interchange server 120 receives a "step-out" command, it will resume the paused business process, continue to either when it finishes executing all the node within the current sub-diagram, or to the next breakpoint, whichever it reaches first, and pause. In the example template, the "step-out" from activity node 402 will end with pausing at end node (step-out the sub-sub diagram).

The Run-to Command.

The "run-to" command includes a parameter to indicate the activity node to which the process wants to run. After the interchange server 120 receives the "run-to" command, it resumes the paused process, and continues to either the "run-to" node or a breakpoint, whichever it reaches first, and pause.

The Continue Command.

After the interchange server 120 receives the "continue" command it resumes the business process, continues until it either reaches another breakpoint or the flow finishes, and then stops.

More Detail on the Communication.

One direction of communication is initiated from the debugger 160 to interchange server 120. Before the collaboration debugger 160 can start debugging a running collaboration 120, the debugger 160 needs to get an IDL (interface definition language) interface ICollaboration. Through this interface, the debugger 160 can issue various commands such as beginning/ending a debug session, setting/unsetting breakpoints, fetching variables, etc.

The other direction of communication is initiated from interchange server 120 to the debugger 160. While a running collaboration 140 is in a debugging mode, it needs to notify various status—such as where it is executing in the activity diagram, whether a breakpoint is reached, back to the collaboration debugger 160 attached to it. The callback interface that will be used is IRteDebuggerCallback.

Before the collaboration debugger 160 attaches to a running collaboration 140, the debugger 160 needs to create an instance of a implementation of IRteDebuggerCallbackPOA. When it attaches to the running collaboration, the debugger needs to pass the above implementation to the collaboration and from then on, the collaboration 120 can send notification information back to the debugger 160 through the IRteDebuggerCallbackPOA implementation.

Collaboration Activity Diagram and Where to Stop the Process.

As briefly discussed above, the collaboration in interchange server 120 is a software module that represents a business process. A business process can be depicted as an activity diagram in a UML (unified modeling language) module. A feature of interchange server 120 is performed at design time when a user compiles an activity diagram. The interchange server 120 transfers the diagram into a Java class and at runtime, the interchange server 120 executes the business process by executing an instance of the Java class to process a triggering event.

In the example discussed herein (see FIGS. 2A, 2B, and 2C), each activity node is transferred to a Java "switch case" section. Before an instance of Java class executes each "switch case" section, it dequeues a continuation context. A continuation context has information of which activity node to execute.

The server side support of the collaboration debugger 160 is at each_dequeueCC( )—the point when the engine fetches the continuation context and decides what to do next for a particular event, it will check if the current collaboration manager is in debugging mode. If it is, check if the current step is a breakpoint. If it is, notify the Collaboration Debugger client and wait for further instructions.

IDL Changes

The communication between the collaboration debugger 160 and interchange server 120 are two-way. There is one IDL interface to define all APIs for each way. These two IDL interfaces are the ICollaboration and the IDeuggerCallback.

The ICollaboration is an IDL interface to define all collaboration related APIs such as start/stop/pause a collaboration, get collaboration name, etc. It also defines all debugging-related APIs that initiate from the collaboration debugger 160 (client) to a running collaboration 120 (server). The debugging-related APIs in ICollaboration has four kinds of APIs: Debug session management APIs; Breakpoint management APIs; Breakpoint management APIs; and Process management APIs.

Debug session management APIs. The Collaboration Debugger can use them to start, stop a debug session, or to query whether a collaboration is in a debugging session.

Breakpoint management APIs. A debugger can use these APIs to set or unset breakpoint(s).

Process management APIs. When an instance of business process of a running collaboration pauses at a breakpoint, a debugger can use these APIs to resume the paused process and instruct it to how to proceed. For example, a debugger can instruct a paused process to step-over the current node and pause at the next activity node.

Variable inspection APIs. When an instance process pauses at a breakpoint, a debugger can use these APIs to get values of some of collaboration variables to display to customer.

The IDebuggerCallback IDL interface defines debugging APIs that are used by running collaboration to notify an attached debugger for various status, such as a breakpoint and/or an activity node is reached, an unhandled exception is happening, or the being debugged business process has finished.

Sequence Diagram

In the sequence diagram set forth in FIG. 2, there is shown how a collaboration debugger 160 interacts with an interchange server's 120 collaboration manager, and how the collaboration manager interacts with the running instance of collaboration object and one or more incoming events. Because the relationship of collaboration manager and collaboration object is one-to-one in an interchange server, we can think at runtime, of a collaboration manager as a collaboration object.

From the sequence diagram 200, a debugging session starts when the collaboration debugger 160 attaches to a collaboration manager. At that moment, the collaboration manager will be in a special mode called the debugging mode.

After the collaboration debugger 160 attaches to a collaboration manager, it can set and/or unset various breakpoints in the business process contained in the collaboration.

When a new triggering event arrives, the new event will be put into the collaboration manager's queue. The manager will grab a running instance of collaboration object to process the event.

When the running collaboration object executes each of the steps in the defined business process, it will check through its manager to determine whether it is in a debugging session and, if it is, whether a breakpoint is reached. If a breakpoint is reached, it will notify the debugger 160 and wait for instructions what to do next.

After the debugger 160 receives a notification that a breakpoint is reached, it could fetch variables from running collaboration to view the process status; it could instruct the running collaboration to continue to either to the next breakpoint (go), or to execute just one more step (step-over).

The user can stop a debugging session by detaching the debugger 160 from the attached running collaboration 140. Upon detaching, the attached collaboration manager should cleanup all the breakpoints and resume any paused running instance.

Two IDL structures are introduced to represent breakpoint, and variable information. They are:

1 struct IBreakPoint {string scenario; //the scenario name of a collaboration that breakpoint is set long graphicId; //the unique node id of a node in a collaboration diagram}; struct IVariable {string name; //variable name string type; //variable data type. Such as int, string, BusObj string subType; //variable subtype. For example, a BusObj's subtype maybe Employee};

ICollaboration: this IDL interface defines all APIs initiated from Collaboration Debugger (client) to running collaboration (server).

Debug Session Management APIs:

1. void IdebugAttach (in string clientCallbackId, in IDebuggerCallback cb)

Description: to start a debugging session, a Collaboration Debugger needs to attach to a running collaboration through this IDL call.

Parameters: clientCallbackId, a unique id to identify the Collaboration Debugger to be attached to the running collaboration.

Cb: a client (collaboration debugger) side implementation of IRteDebuggerCallback to handle server notification of various status change.

Return value: none.

Exception: ICxServerError.

2. void IdebugDetach( )

Description: By calling IdebugDetach( ), the attached Collaboration Debugger ends a running collaboration's debugging session. Upon ending a debugging session, the running collaboration will remove all the debugging settings, such as breakpoint, and resume any business processes that have paused at breakpoints.

Parameters: none

Return value: none.

Exception: none.

3. boolean IdebugIsAttached( )

Description: to check if a running collaboration has a Collaboration Debugger attached to it. If it is, the running collaboration is in debugging mode and no more other Collaboration Debugger can attach to it.

Parameters: none.

Return value: boolean, true if the running collaboration is already in a debugging mode, false otherwise.

Exception: none.

Breakpoint Management APIs:

1. boolean IdebugSetBreakpoint(in IBreakPoint aBreakPoint);

Description: set a breakpoint in an activity diagram of a collaboration.

Parameters: aBrealPoint an IDL breakpoint struct that has the scenario name and unique node id to uniquely represent a node in a collaboration diagram that a breakpoint will be set Return value: boolean, true if setting successes, false otherwise.

Exception: none.

2. boolean IdebugClearBreakpoint(in IBreakPoint aBreakPoint);

Description: to unset a breakpoint in an activity diagram of a collaboration.

Parameters: aBrealPoint an IDL breakpoint struct that represent a breakpoint set in a collaboration diagram.

Return value: boolean, true if unsetting successes, false otherwise

Exception: none.

3. boolean IdebugSetBreakpoints(in Ibreakpoint[ ] breakpoints);

Description: set an array of breakpoints in an activity diagram of a collaboration.

Parameters: breakPoints an array of breakpoints to be set

Return value: boolean, true if setting successes, false otherwise.

Exception: none.

4. boolean IdebugClearBreakpoints (in IbreakPoint[ ] breakpoints);

Description: to clear an array of breakpoints in an activity diagram of a collaboration.

Parameters: breakpoints, an array of breakpoints to be cleared

Return value: boolean, true if clearing successes, false otherwise.

Exception: none.

5. *boolean IdebugClearAllBreakpoints( ):

Description: to clear all the breakpoints set for a running collaboration debugging session Parameters: none.

Return value: boolean, true if unsetting successes, false otherwise. If false, client is responsible to check remaining breakpoints and process accordingly.

Exception: none.

6. IBreakPointEnumeration IdebugGetAllBreakpoints( );

Description: to get all the breakpoints set for a running collaboration's debugging session Parameters: none.

Return value: IBreakPointEnumeration, an enumeration of all the breakpoints set for a collaboration's debugging session.

Exception: none.

Process Control:

1. void IdebugGo(in string stopPointHandle)

raises (ICxServerError);

Description: when an instance of process pauses at a breakpoint, the attached debugger can use this API to resume the instance to continue till it reaches either another breakpoint or the end of the business flow.

Parameters: stopPointHandler, an identifier of which business process instance pauses in server at a breakpoint Return value: void Exception: IcxServerError if server can not execute this command.

2. void IdebugStepOver(in string stopPointHandle)

raises (ICxServerError);

Description: when an instance of process pauses at a breakpoint, the attached debugger can use this API to resume the instance to continue one step over the current activity node. The process will pause at the next activity node in the current activity diagram.

Parameters: stopPointHandler, an identifier of which business process instance pauses in server at a breakpoint Return value: none.

Exception: IcxServerError if server can not execute this command.

3. void IdebugStepInto(in string stopPointHandle)

raises (ICxServerError);

Description: when an instance of process pauses at a sub-diagram (or iterator) node, the attached debugger can use this API to resume the instance to continue one step into the sub-diagram (or iterator sub-diagram). The process will pause at the beginning node in the sub-diagram.

Parameters: stopPointHandler, an identifier of which business process instance pauses in server at a breakpoint Return value: none.

Exception: IcxServerError if server can not execute this command.

4. void IdebugStepOut(in string stopPointHandle)

raises (ICxServerError);

Description: when an instance of process pauses at a breakpoint within a sub-diagram (or iterator sub-diagram), the attached debugger can use this API to resume the instance to continue executing all the activity nodes within this sub-diagram, or to the first breakpoint it reaches within the sub-diagram; the process will pause and wait for further instruction from the debugger.

Parameters: stopPointHandler, an identifier of which business process instance pauses in server at a breakpoint Return value: none.

Exception: IcxServerError if server can not execute this command.

5. void IdebugRunTo(in string stopPointHandle, in IBreakPoint aBreakPoint)

raises (ICxServerError);

Description: when an instance of process pauses at a breakpoint, the attached debugger can use this API to resume the instance to continue to run, until it reaches either an activity node specified in this API, or a breakpoint, whichever it reaches first.

Parameters: stopPointHandler, an identifier of a business process instance that is pausing at a breakpoint aBreakPoint, a activity node info. (represented as a breakpoint) that the being resumed business process expected to run to. Upon reaching this node, the process will pause as it reaches a breakpoint.

Return value: none.

Exception: IcxServerError if server can not execute this command.

Variable Inspection

1. Ivariable[ ] IdebugGetAllVariables(in string stopPointHandle);

Description: an attached collaboration debugger can use this API to get all the names of variables defined in a running collaboration that can be viewed.

Parameters: stopPointHandle, an identifier of a business process instance that is pausing at a breakpoint.

Return value: an array that holds all the visible variables from a debugging session.

Exception: none.

2. wstring IdebugGetVariable(in string stopPointHandle, in string varName) raises (ICxServerError);

Description: to get the current value of a particular variable in a running collaboration instance.

Parameters: stopPointHandle, an identifier of a business process instance that is pausing at a breakpoint.

VarName, the name of a variable to be displayed at a collaboration debugger.

Return value: wstring, a string value of the variable. If the variable is a business object, the value is serialized string value. If it is a primitive type, the value is in string format.

Exception: none.

IDebuggerCallback (APIs Used by a Running Collaboration to Notify Attached Debugger Numerous Status Change)

1. void IexceptionEvent(in string stopPointHandle, in string clientCallbackId, in string rteObjTempName, in string rteObjName, in string rteObjInstanceId,
in string rteMethodName,
in string diagramPath,
in long stepGraphicId,
in string encodedFormat,
in wstring errorText);

Description: to notify the debugger that there is an unhandled exception occurs in a business process. Please refer to "collaboration developer guide" for the concept of handled exception.

Parameters: clientCallbackId, an identifier of a collaboration debugger rteObjTempName, the collaboration object's template name rteObjName, the collaboration object name rteObjInstanceId, an instance id of the running collaboration object (business process)

rteMethodName, the scenario name diagramPath, the diagram path of the end node stepGraphicId: the id of the end node encodedFormat: the character encoding format errorText: the error message Return value: none.

Exception: none.

2. void IprintToConsole(in string serverName, in string encodedFormat, in string text);

Description: to check if a running collaboration has a Collaboration Debugger attached to it. If it is, the running collaboration is in debugging mode and no more other Collaboration Debugger can attach to it.

Parameters: none.

Return value: boolean, true if the running collaboration is already in a debugging mode, false otherwise.

Exception: none.

3. void IbreakpointEvent(in string stopPointHandle,
in string clientCallbackId,
in string rteObjTempName,
in string rteObjName,
in string rteObjInstanceId,
in string rteMethodName,
in string diagramPath,
in long stepGraphicId);

Description: to notify the attached debugger that the instance of running business process has reached a breakpoint.

Parameters: stopPointHandle, an identifier of a business process instance that is paused at a breakpoint.

clientCallbackId, an identifier of a collaboration debugger rteObjTempName, the collaboration object's template name rteObjName, the collaboration object name rteObjInstanceId, an instance id of the running collaboration object (business process)

rteMethodName, the scenario name diagramPath, the diagram path of the breakpoint node stepGraphicId: the id of the node where a breakpoint is reached Return value: void Exception: none.

4. void IexecutingNode(in string stopPointHandle,
in string clientCallbackId,
in string rteObjTempName,
in string rteObjName,
in string rteObjInstanceId,
in string rteMethodName,
in string diagramPath,
in long stepGraphicId);

Description: to notify the attached debugger of which activity node the instance of running business process has reached a breakpoint.

Parameters: stopPointHandle, an identifier of a business process instance that is paused at a breakpoint.

clientCallbackId, an identifier of a collaboration debugger rteObjTempName, the collaboration object's template name rteObjName, the collaboration object name rteObjInstanceId, an instance id of the running collaboration object (business process)

rteMethodName, the scenario name diagramPath, the diagram path of the executing node stepGraphicId: the id of the executing node Return value: void Exception: none.

5. void IendOfFlowEvent(in string stopPointHandle,
in string clientCallbackId,
in string rteObjTempName,
in string rteObjName,
in string rteObjInstanceId,
in string rteMethodName,
in string diagramPath,
in long stepGraphicId);

Description: to notify the attached debugger that a flow event is reaching its end node.

Parameters: stopPointHandle, an identifier of a business process instance that is paused at a breakpoint.

clientCallbackId, an identifier of a collaboration debugger rteObjTempName, the collaboration object's template name rteObjName, the collaboration object name rteObjInstanceId, an instance id of the running collaboration object (business process)

rteMethodName, the scenario name diagramPath, the diagram path of the end node stepGraphicId: the id of the end node Return value: void Exception: none.

6. void InewEvent(in string stopPointHandle,
in wstring busobj);

Description: to notify the attached debugger that a new event will start in a debugging session Parameters: stopPointHandle, an identifier of a business process instance busobj, a serialized string value of triggering bus obj Return value: void Exception: none.

Therefore, while there has been described what is presently considered to be the preferred embodiment, it will understood by those skilled in the art that other modifications can be made within the spirit of the invention.

The invention claimed is:

1. A system for debugging an application collaboration in an interchange server, the method comprising:

A processor configured for:

creating a collaboration object from a template:

configuring the collaboration object by binding said collaboration object to connectors or other collaboration objects;

deploying the collaboration object:

retrieving a collaboration name using an IDL Interface ICollaboration;

creating an instance of an implementation of IRteDebuggerCallbackPOA portable object adapter;

attaching a debugger to a remote running application collaboration executing a business process by passing the implementation through an IDebuggerCallback IDL interface of the collaboration;

initiating a debugger session;

receiving a set of breakpoints to be inserted into designated points in the debugging session;

inserting the set of breakpoints into designated points in the debugging session;

stopping the running of the application collaboration at one or more of the breakpoints;

determining a status of the business process; and presenting a user with information relating to where the business process has stopped, the status of the process flow, and how to continue the business process.

2. The system of claim 1 wherein the processor is further configured for receiving a step-over command, and resuming the business process, to continue to a subsequent activity node and pause.

3. The system of claim 1 wherein the processor is further configured for receiving a step-into command and resuming the paused business process to continue to the first node in response to receiving the step-into command.

4. The system of claim 1 wherein the processor is further configured for receiving a step-out command and resuming the running of the application collaboration responsive to receiving the step-out command.

5. The system of claim 1 wherein the processor is further configured for receiving a run-to command comprising a parameter and indicating an activity node to which the application collaboration responsive to receiving the run-to command.

6. The system of claim 1 wherein the processor is further configured for receiving a continue command comprising a parameter and indicating an activity node to which the application collaboration will proceed in response to receiving the continue command.

7. The system of claim 1 wherein the processor is further configured for receiving a request for data relating to the process from a user.

8. The system of claim 1 wherein the processor is further configured for receiving a command to instruct the flow how to proceed.

9. The system of claim 1 wherein the processor is further configured for presenting a user information on how to continue the process.

* * * * *